(12) United States Patent
Baustad

(10) Patent No.: US 11,053,751 B2
(45) Date of Patent: Jul. 6, 2021

(54) CABLE PROTECTING DEVICE

(71) Applicant: Roxar Flow Measurement AS, Stavanger (NO)

(72) Inventor: Terje Baustad, Hafrsfjord (NO)

(73) Assignee: Roxar Flow Measurement AS, Stavanger (NO)

( * ) Notice: Subject to any disclaimer, the term of this patent is extended or adjusted under 35 U.S.C. 154(b) by 0 days.

(21) Appl. No.: 16/635,646

(22) PCT Filed: Aug. 7, 2018

(86) PCT No.: PCT/EP2018/071393
§ 371 (c)(1),
(2) Date: Jan. 31, 2020

(87) PCT Pub. No.: WO2019/042722
PCT Pub. Date: Mar. 7, 2019

(65) Prior Publication Data
US 2021/0040799 A1 Feb. 11, 2021

(30) Foreign Application Priority Data
Aug. 30, 2017 (NO) .................................... 20171402

(51) Int. Cl.
*E21B 17/10* (2006.01)
*B25B 21/00* (2006.01)
(Continued)

(52) U.S. Cl.
CPC ........ *E21B 17/1035* (2013.01); *B25B 21/002* (2013.01); *E21B 17/026* (2013.01);
(Continued)

(58) Field of Classification Search
CPC ...... E21B 17/035; E21B 17/026; E21B 17/02; E21B 17/10
See application file for complete search history.

(56) References Cited

U.S. PATENT DOCUMENTS 5,722,840 A * 3/1998 Auclair .................. H01R 4/363
439/793
6,182,846 B1 * 2/2001 Leschinger .............. H02B 1/50
174/37
(Continued)

FOREIGN PATENT DOCUMENTS

DE 924141 C 2/1955
GB 2377717 B 8/2005
(Continued)

OTHER PUBLICATIONS

Dantinne, Patrick, International Search Report prepared for PCT/EP2018/071393, dated Dec. 5, 2018, 4 pages.

*Primary Examiner* — Tara Schimpf
*Assistant Examiner* — Manuel C Portocarrero
(74) *Attorney, Agent, or Firm* — Shackelford, Bowen, McKinley & Norton, LLP

(57) ABSTRACT

Cable protecting device protects cables extending over a feature on a pipe surface. The feature is a known length outside the pipeline circumference and has a first and second end surface. The device has a length in the direction of the pipeline longer than the feature and includes a channel for enclosing the cable and a recess in the inner surface for containing at least a part of the feature. The ends of the device at least partially cover the corresponding parts of the feature ends. The length of the recess corresponds essentially to the length of the feature. Each end of the recesses is provided with engaging means adapted to engage with the corresponding end surfaces of the feature. The protecting device is made in one piece, including a flexible spring section in the section extending over the recess, between the first and second ends of the device.

12 Claims, 2 Drawing Sheets

(51) Int. Cl.
  *E21B 17/02* (2006.01)
  *B23P 19/06* (2006.01)
(52) U.S. Cl.
  CPC ............. *B23P 19/061* (2013.01); *E21B 17/02* (2013.01); *E21B 17/10* (2013.01)

(56) References Cited

U.S. PATENT DOCUMENTS

| | | |
|---|---|---|
| 7,784,537 B2 | 8/2010 | Baxter |
| 9,500,042 B2 | 11/2016 | Baustad |
| 10,337,260 B2 | 7/2019 | Baustad |
| 2016/0290835 A1 | 10/2016 | McCoy |

FOREIGN PATENT DOCUMENTS

| | | |
|---|---|---|
| WO | WO-1994011609 A1 | 5/1994 |
| WO | WO-2014180816 A2 | 11/2014 |
| WO | WO-2016190747 A1 | 12/2016 |

\* cited by examiner

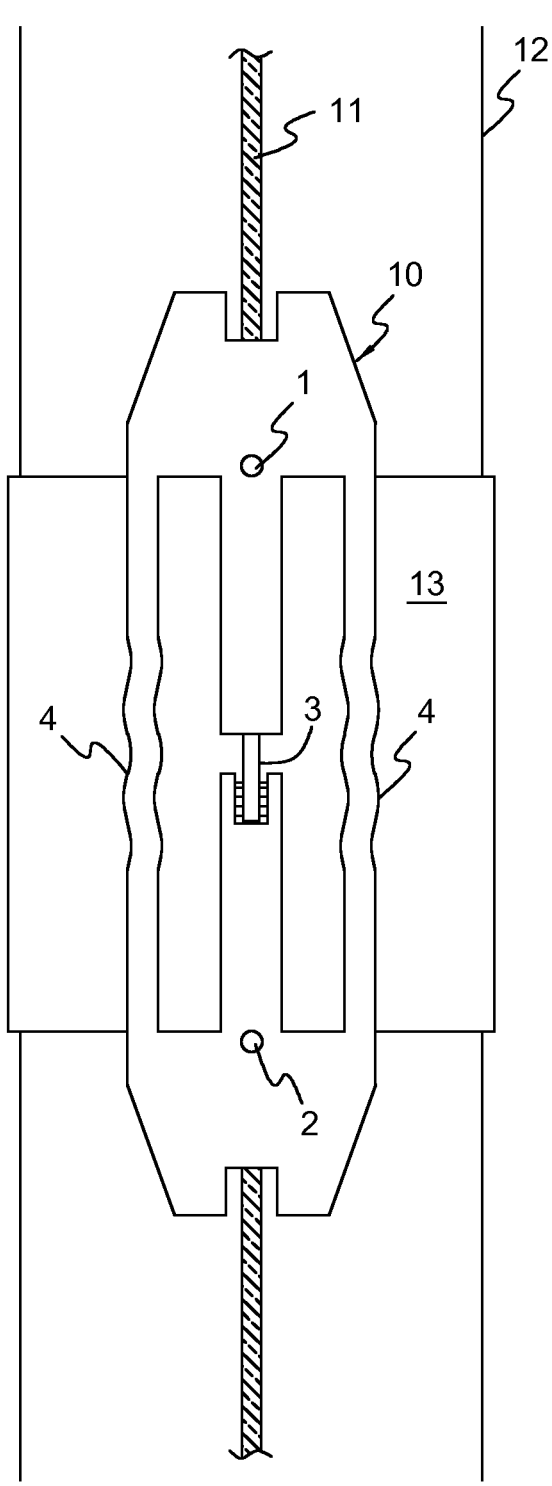
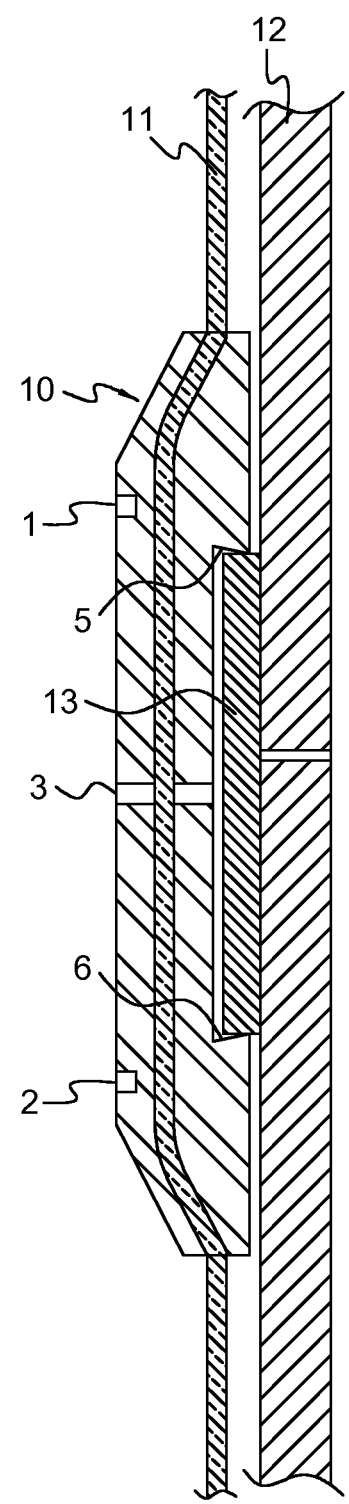
FIG. 1
FIG. 2

US 11,053,751 B2

CABLE PROTECTING DEVICE

The present invention in general relates to a cable protecting device for its application within a well bore, for protecting cables extending downwards through the bore holes.

Particularly, the present invention relates to a cable protecting device, which can be easily and rigidly mounted on pipes, especially on features like collars or sleeves over connections in downhole pipes or tubing and the like.

TECHNICAL BACKGROUND OF THE INVENTION

Extending cables down through wellbores, is a very common exercise, especially in hydrocarbon production/injection and exploration operations. Cable protecting devices in various forms are also known for rigidly holding the cable, to transfer its weight to the well bore conduit or tubing during operation. Such cable protecting device also serve to prevent the cable from moving within the well bore, so that it does not undergo abrasion or wear by impact or rubbing with the well wall or casing. Such movement may take place for example, when a motor of a submerged electric pump, to which the cable may be connected, is put on or put off, which trigger vibrations within the well bore. Such movement may also take place during lifting/lowering of any equipment with the cable attached.

The cable protecting devices known in the art are usually mounted on pipes, such as, but not limited to production tubing. The cables may be banded or strapped to the production tubing at intervals, for transferring the weight of the cable on the production tubing, e.g. as described in U.S. Pat. No. 7,784,537, GB2377717B and WO1994/011609. A similar solution is shown in DE924141C where springs are clipped around the pipe to keep a device in place.

The mounting of the cable protection devices above is, however, time consuming. This is particularly true, because fairly a large number of such cable protecting devices, are required in each well. A solution to this problem has been proposed in U.S. Pat. No. 9,500,042 which clamps a cable protection device to the ends of a feature on the pipe such as a collar or sleeve enclosing a pipe coupling point, without the need for straps or similar extending around the pipe.

The solution described in U.S. Pat. No. 9,500,042 is, however, relatively complex including several different parts, which both increases the cost and the chance of failure in some component, increasing the risk of falling inside the well, which obviously requires substantially expensive, recovery and corrective operations.

Prior art also depends to a large extent on human intervention to be mounted on the pipe. The area on an installation where the Cable protection device is normally mounted is the Drill floor and more specific an area of the Drill floor often designated as the "red zone" due to its risk classification for operating personnel.

Thus it is an objective of this invention to provide a simplified and inexpensive cable protecting device for protecting cables which has a simple arrangement for rigidly mounting it on a feature such as a collar over at a pipe joint, especially on a connection in a down hole pipe, so that the mounting and removal operation of the cable protecting device is not time consuming and simultaneously being sufficiently secure to reduce the chances of parts falling off of the device or its parts and fall into the well bore. It is also desired to minimize or eliminate the need for human interaction to ensure less risk of injury to personnel. The present invention will allow for robotic installation hence reducing human interaction considerably. The objective of the invention is obtained with a cable protection device according to the accompanying claims. Thus the present invention provides a cable protection device, including a channel for at least one cable extending along the length of the device in the direction of the pipe. The cable protecting device extends in the axial direction over a collar, sleeve or similar feature on a pipe or pipeline and may be produced in one single part. This feature extends along a length of the pipe and has a first and second end surface protruding outside the pipe outer surface providing a grip for an axially directed engaging means in the protection device.

The cable protecting device according to the invention therefore defines a clamp being longer than the feature and defines a recess in the cable protecting device for enclosing part of the outer surface and ends of the feature, where the cable protecting device has engagement means adapted to engage in said features in opposite axial directions, preferably wedge shaped for engaging between a collar and a pipe or by applying a force towards said feature ends.

The present invention will be described below with reference to the accompanying drawings, illustrating the invention by way of example.

FIG. 1 illustrates an embodiment of the invention as seen straight on as mounted on a pipe.

FIG. 2 illustrates a half cross section of the embodiment illustrated in FIG. 1, rotated 90 degrees from FIG. 1.

Figure 3:
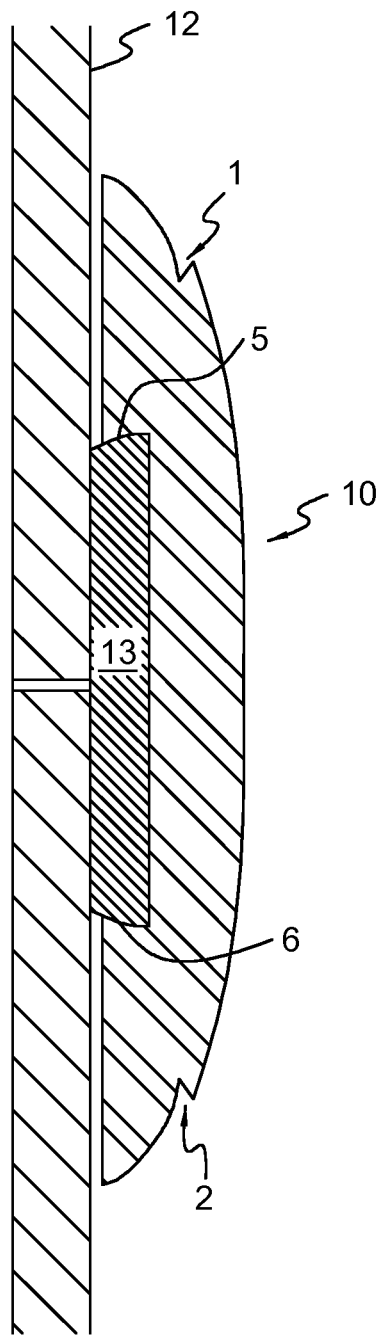
FIG. 3 illustrates an alternative embodiment of the invention.

In FIG. 1 the cable protection device (10) or clamp according to the invention is illustrated being mounted in a collar (13) along a pipe (12). A cable (11) passes in a channel in the device and is thus protected over the collar (13). In the drawings the channel extends through and being completely enclosed by the protection device, but may alternatively be constituted by a recess or groove between the protection device and the pipe and collar, so that the device may be positioned over the cable (11) in the same operation as the mounting of the device to the collar.

The cable protecting device (10) is made in one piece with a middle portion in the direction of the pipe having at least one spring section (4) and connection points (1,2) for coupling to a mounting tool (not shown). The mounting tool may be of any type suitable for applying a force on the cable protecting device (10) by stretching the device (10) in the longitudinal direction before positioning onto the collar (13). Depending on the necessary spring force as well as the type of mounting tool the connection points may be unnecessary, as the mounting tool may engage in other features on the protection device or the application will simply allow mounting by hand.

This is illustrated in FIG. 2 where the device has engaging means (5,6) that engage into the collar (13) ends when the mounting tool has released the stretch on the device (10). The engaging means (5,6) may be wedge shaped or similar being capable of engaging into corresponding structure in the collar (13) ends or into a space between the collar (13) and pipe (12), or the spring force from the spring sections (4) may simply provide and maintain a sufficient friction to provide a grip on the collar (13) ends to keep the device (10) in place when the force on the spring section (4) is released.

In the illustrated embodiment spring sections (4) are symmetrically positioned on both sides of the channel containing the cable (11), and in order for the device (10) to expand in the longitudinal direction the channel may be provided with an interruption or opening (3) that allows the first and second end of the device (10) to move in relation to each other. As an alternative the interruption (3) may be constituted by a flexible body or cover.

Other solutions are also possible, e.g. with a spring section (4) extending over the middle part of the device (10) and also covering the cable channel.

Although a collar (13) is shown and discussed here it is clear that the device (10) may be clamped onto any feature along a pipe having corresponding end parts that can provide a grip for the engaging means (5,6).

This way the present invention simplifies casting/machining and installation of a cable protection device considerably. It will consist of one part only. The part may be cast in an initial raw state. Various heat treatments may be applied to the clamp (or parts thereof) constituting the protection device to achieve desired mechanical properties. This may be for example elasticity or hardness changes.

After casting and, if necessary de-burring and surface finish the protection device or clamp may be further improved by machining of lip shaped engaging means (5,6) to grip on the collar (13) to desired tolerance. The center part of the clamp (10) may need to be cut (3) to allow for independent movement of the end sections of the device (10). Necessary holes or recesses (1,2) or other suitable connection features need to be made at both ends of the device (10) to allow for a mounting/dismounting tool to be attached.

Hence the cable protection device or clamp (10) is mounted on an installation tool (not shown) via recess/holes (1,2) and the installation tool will need to be designed to elongate the clamp (10) sufficiently for the lip shaped engaging means (5,6) to be further apart than the length of the collar (13) to fit the clamp (10) on to.

In mounting, the cable (11) or cables to be protected is placed in a channel between the clamp (10) and the collar (13), and the clamp (10) is pushed towards the collar (13). Still holding the clamp (10) and cable (11) towards the collar (13) the mounting tool releases the grip allowing the clamp (10) to firmly engage the engaging means (5,6) against the space between the collar (13) and the pipe (12).

The holes/recesses (1,2) may be designed such that a mounting tool may be used to verify that the clamp (10) is firmly gripping prior to releasing the mounting tool from the clamp (10).

Figure 4:
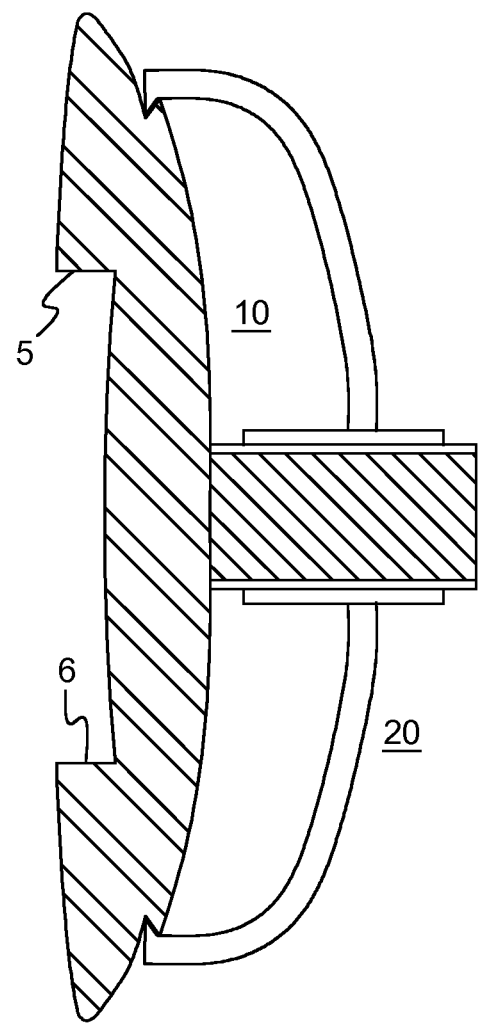
FIG. 4 illustrates the mounting of a device as illustrated in FIG. 3

FIGS. 3 and 4 illustrates an alternative way of mounting the clamp (10) using a mounting tool (20) that engages into the connection parts 1,2 and bends it backward in order to open the recess so as to fit onto the collar (13), the spring force providing a grip against the collar (13) ends or forcing the engaging means (5,6) in between the collar (13) and pipe (12) or possibly into structures in the collar ends. For simplicity the channel or recess as well as the cable (11) has been omitted from the drawings but as in FIGS. 1 and 2 will essentially pass through the device in a channel, e.g. constituted by a recess or groove between the device and the collar and pipe. In this case the interruption in the cable channel or recess may be omitted as the complete device is bent.

A further alternative method of mounting the device is by applying a radial force, pushing the cable protecting device hard against the collar. Having slightly sloped corner at clamp and/or collar will then force the cable protection device or clamp (10) to stretch or bend at the flexible section, allowing the clamp (10) to be pushed in place and then be locked in place by a grip against the collar (13) ends or by forcing the engaging means (5,6) in between the collar (13) and pipe (12). In this latter design, it will be apparent that the couplings points (1,2) will not be required or may be constituted by grips for a mounting tool for holding the device (10).

To summarize, the present invention relates to a cable protecting device or clamp (10) for protecting cables (11) or other equipment extending over a feature, such as a collar (13) covering a pipe connection, on a pipe surface. The feature (13) having a known length outside said pipe circumference and having a first and second end surface. The cable protecting device having a length in the direction of the pipe being longer than the said feature (13), and comprises a channel for enclosing the cable(s) (11) to be protected and a recess in the inner surface adapted for containing at least a part of the feature (13) and the features having first and second end surfaces, the ends of said protection device at least partially covering the corresponding parts of the feature (13) ends.

The length of the protection device or clamp (10) recess corresponds essentially to the length of the feature (13), each end of said recess being provided with engaging means (5,6) adapted to engage with the corresponding end surfaces of the feature (13) thus fixing the protecting device (10) to the feature (13). The protecting device according to the invention is made in one piece, including at least one flexible spring section (4) in the section extending over the recess, between the first and second ends of the device. The spring section (4) may allow extension of the clamp (10) length and/or bending the device as well as a force or grip against the feature (13) end surfaces (5,6).

The device according to the invention may include at least one coupling point 1,2 on each side of the spring section for a mounting tool forcing the device (10) ends away from each other.

The spring section (4) may be adapted to be forced by the mounting tool in the direction along the pipe (12) direction, thus forcing the end parts away from each other and, when the mounting tool release the spring (4) the engaging means (5,6) engaging into the feature (13) ends. Alternatively the spring section is adapted to be bent by the mounting tool in a direction away from the pipe, thus engaging into the collar when the force is released. Or in a further alternative design, the clamp is forced to bend or stretch by applying a force in the radial direction.

The spring part (4) may be adapted to provide a force through the engaging means (5,6) to the feature (13) or collar ends, or at least one of said engaging means (5,6) is adapted to engage into the interface zone between the collar (2) and the pipe (1), for example by providing wedge shaped engaging ends on the feature (13) to the suit or match the engaging means (5,6).

The spring section (4) or sections may have different shapes such as one spring section on each side of the channel in the longitudinal direction, where the channel is provided with an interruption with a chosen length so as to allow movements between the first and second ends of the cable protecting device (10). Alternatively the spring section (4) may extend over the width of the cable protecting device (10).

The cable channel extending along the cable protecting device (10) length for holding the cable (11) may have a serrated surface or other suitable patterns to enable the device to grip the cable (11) thus preventing movement of cable (11) relative to pipe (12).

In a similar manner the contact surface between the cable protecting device (10) and the pipe (12) and/or collar (13), may have a serrated surface or other suitable pattern to increase surface friction to prevent rotational movement of the Cable protecting device (10) relative to the pipe (12) or collar (13).

The invention claimed is:

1. A cable protecting device for protecting cables extending over a feature on a pipe surface, the feature having a known length outside a circumference of the pipe and having a first and second end surface, the cable protecting device comprising:
   a length in a direction of the pipe being longer than the feature;
   a channel for enclosing the cable to be protected and a recess in an inner surface adapted for containing at least a part of the feature and the features first and second end surfaces, the ends of the cable protecting device at least partially covering the corresponding parts of the feature ends;
   wherein a length of the recess corresponds essentially to a length of the feature, each end of the recess being provided with engaging means adapted to engage with the corresponding end surfaces of the feature, thus fixing the cable protecting device to the feature;
   wherein the cable protecting device is made in one piece, including a flexible spring section in a section extending over the recess, between first and second ends of the cable protecting device; and
   one flexible spring section on each side of the channel in a longitudinal direction, the channel being provided with an interruption with a chosen length so as to allow movements between the first and second ends of the device while maintaining protection of the cable.

2. The cable protecting device according to claim 1, comprising at least one coupling point on each side of the flexible spring section for a mounting tool forcing the cable protecting device ends away from each other.

3. The cable protecting device according to claim 2, wherein the flexible spring section is adapted to be forced by the mounting tool in the direction along the pipe direction.

4. The cable protecting device according to claim 2, wherein the spring section is adapted to be bent by the mounting tool in a direction away from the pipe, thus engaging into the collar when the force is released.

5. The cable protecting device according to claim 1, wherein at least one of the engaging means is adapted to engage into an interface zone between the collar and the pipe.

6. The cable protecting device according to claim 5, wherein an engaging end of the engaging means is wedge shaped.

7. The cable protecting device according to claim 1, wherein the flexible spring section extends over the width of the cable protecting device.

8. The cable protecting device according to claim 1, wherein a cable channel has serrated surface or other suitable patterns to enable the cable protecting device to grip the cable thus preventing movement of the cable relative to pipe.

9. The cable protecting device according to claim 1, comprising a serrated surface or other suitable pattern to increase surface friction to prevent rotational movement of the cable protecting device relative to the pipe or collar.

10. The cable protection device according to claim 1, wherein the channel is constituted by a groove being adapted to enclose and hold the cable between the cable protecting device and the pipe and features.

11. A cable protecting device for protecting cables extending over a feature on a pipe surface, the feature having a known length outside a circumference of the pipe and having a first and second end surface, the cable protecting device comprising:
   a length in a direction of the pipe being longer than the feature;
   a channel for enclosing the cable to be protected and a recess in an inner surface adapted for containing at least a part of the feature and the features first and second end surfaces, the ends of the protecting device at least partially covering the corresponding parts of the feature ends;
   wherein a length of the recess corresponds essentially to a length of the feature, each end of the recess being provided with engaging means adapted to engage with the corresponding end surfaces of the feature, thus fixing the cable protecting device to the feature;
   wherein the cable protecting device is made in one piece, including a flexible spring section in a section extending over the recess, between first and second ends of the cable protecting device;
   at least one coupling point on each side of the spring section for a mounting tool forcing the cable protecting device ends away from each other; and
   wherein the spring section is adapted to be forced by the mounting tool in the direction along the pipe direction.

12. A cable protecting device for protecting cables extending over a feature on a pipe surface, the feature having a known length outside a circumference of the pipe and having a first and second end surface, the cable protecting device comprising:
   a length in a direction of the pipe being longer than the feature;
   a channel for enclosing the cable to be protected and a recess in an inner surface adapted for containing at least a part of the feature and the features first and second end surfaces, the ends of the cable protecting device at least partially covering the corresponding parts of the feature ends;
   wherein a length of the recess corresponds essentially to a length of the feature, each end of the recess being provided with engaging means adapted to engage with the corresponding end surfaces of the feature, thus fixing the cable protecting device to the feature;
   wherein the cable protecting device is made in one piece, including a flexible spring section in a section extending over the recess, between first and second ends of the cable protecting device;
   at least one coupling point on each side of the spring section for a mounting tool forcing the cable protecting device ends away from each other; and
   wherein the spring section is adapted to be bent by the mounting tool in a direction away from the pipe, thus engaging into the collar when the force is released.

* * * * *